Patented Mar. 22, 1932

1,850,526

UNITED STATES PATENT OFFICE

ARTHUR ZITSCHER, OF OFFENBACH-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING 2.3-AMINONAPHTHOL COMPOUNDS

No Drawing. Application filed December 16, 1927, Serial No. 240,630, and in Germany December 24, 1926.

I have found that 2.3-aminonaphthol compounds can be obtained by a smooth reaction, if O-arylsulfonic esters of 3.2-hydroxynaphthalenecarboxyamido compounds of the formula

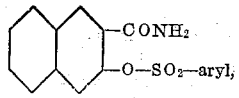

in which formula the naphthalene nucleus may contain further substituents, are subjected to the action of alkali metal salts of the hypochlorous or hypobromous acid according to Hofmann's reaction and if in the formed O-arylsulfonyl-2.3-aminonaphthol compounds of the formula:

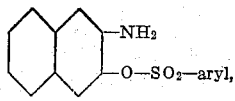

in which formula the naphthalene nucleus may contain further substituents, the arylsulfonic residue is split off by treatment with saponifying agents.

This is a surprising fact, as in the Berichte der Deutschen Chemischen Gesellschaft, vol. 58, page 2848, Fries describes his vain efforts, to transform the amide of 2.3-hydroxynaphthoic acid or its ethylcarbonic ester into 3.2-aminonaphthol according to Hofmann's reaction of decomposition.

My new process allows to manufacture 2.3-aminonaphthol and its nuclear substitution products with an excellent yield and in a very pure state. They may be used as intermediates for the production of dyestuffs.

In order to further illustrate my invention the following examples are given, the parts being by weight and all temperatures in centigrade degrees. But I wish to be understood that my invention is not limited to the particular conditions nor to the specific products mentioned therein.

*Example 1.*—341 parts of 3-(para-toluene-sulfonyl-oxy)-naphthalene-2-carboxyamide (crystallizing from glacial acetic acid as felt-like needles, melting at 216° (not corrected), obtainable by acting with para-toluenesulfochloride on 3.2-hydroxynaphthalenecarboxyamide in dilute alkaline solution), are mixed with spirit and at ordinary temperature a solution of sodium hypochlorite, containing 71 parts of active chlorine, and 250 parts of calcinated soda are added. The mass is warmed at about 65° for an hour, being slowly dissolved thereby, and then it is heated to boiling for some time. When filtered, the alcohol is mostly distilled off from the mother-liquor and by adding water the 2-amino-para-toluene-sulfonyl-3-naphthol of the formula:

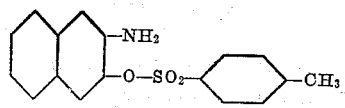

is separated. When recrystallized from alcohol the new compound is obtained as colorless bright scales melting at 144–145°, (not corrected). When treating it with saponifying agents f. i. with an alcoholic caustic soda solution in the heat with a good yield 2.3-aminonaphthol is formed, which may be advantageously isolated as hydrochloric salt. It shows the properties, described in literature.

*Example 2.*—327 parts of 3-(benzenesulfonyl-oxy)-naphthalene-2-carboxyamide (crystallizing from alcohol or glacial acetic acid as colorless needles, melting at 170°, (not corrected), obtainable by acting with benzenesulfochloride on 3.2-hydroxynaphthalenecarboxyamide in dilute alkaline solution) are suspended in spirit and at ordinary temperature 160 parts of carbonate of soda and a quantity of a sodium hypochlorite solution corresponding to 71 parts of active chlorine, are added. When after some time the mass is dissolved, most of the alcohol is distilled off and the 2-amino-benzenesulfonyl-3-naphthol, contained in the solution, is saponified by shortly boiling the solution with addition of a caustic soda solution and the 2.3-aminonaphthol, obtained with an excellent yield, is isolated as base or as hydrochloric salt.

*Example 3.*—266 parts of 7-bromo-3-hydroxy-2-naphthol-amide (obtained from 7-bromo-3-hydroxy-2-naphthol-chloride and ammonia as light yellowish lamellas of the F. P. 295° (not corrected)) are dissolved in caustic soda solution and heated to boiling with 210 parts of p-toluene-sulfochloride for a short time. The thus obtained 7-bromo-3-(4'-toluenesulfonyl)-oxy-naphthalene-2-carboxyamide of the formula:

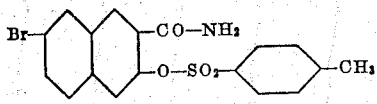

crystallizes from acetic acid as colorless needles of the F. P. 184–185° (not corrected).

By Hofmann's reaction of decomposition this body yields the 7-bromo-3-(4'-toluenesulfonyl)-oxy-2-amino-naphthalene (crystallizing from dilute alcohol as colorless needles of the F. P. 105° (not corrected)), of the formula:

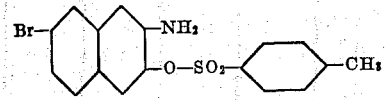

which forms by saponification the 7-bromo-2-amino-3-naphthol of the formula:

It crystallizes from water as colorless thin bright leaflets of the F. P. 222° (not corrected).

All these products are new compounds.

In the same manner other nuclear substitution products of 2.3-aminonaphthol may be obtained.

I claim:

1. Process for manufacturing 2.3-aminonaphthol compounds of the formula:

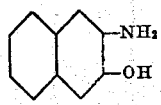

which process comprises subjecting O-arylsulfonic esters of 3.2-hydroxynaphthalenecarboxyamido compounds of the formula:

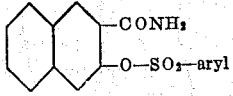

to the action of alkali metal salts of hypochlorous or hypobromous acid according to Hofmann's reaction of decomposition and splitting off from the O-arylsulfonyl-2.3-aminonaphthol compounds of the formula:

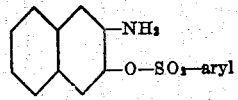

the arylsulfonic residue by treatment with saponifying agents, in which process in all aforesaid formulas the naphthalene nucleus may contain further substituents.

2. As a new compound 7-bromo-2-amino-3-naphthol of the formula:

being when dry a colorless powder, crystallizing as thin bright leaflets from water, having a definite melting point, which compound is substantially identical with a product obtainable by subjecting a 7-bromo-3-(arylsulfonyl) oxy-naphthalene-2-carboxyamide to the decomposition reaction of Hofmann and treating the 7-bromo-3-(arylsulfonyl) oxy-2-amino-naphthalene thus formed with saponifying agents.

3. In the process for producing 2.3-aminonaphthol compounds the manufacture of O-arylsulfonyl-2.3-aminonaphthol compounds of the formula:

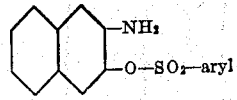

which comprises subjecting O-arylsulfonic esters of 3.2-hydroxy-naphthalene-carboxyamido compounds of the formula:

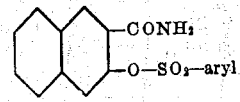

to the action of alkali metal salts of hypochlorous or hypobromous acid according to Hofmann's reaction of decomposition, in which manufacture in the aforesaid formulas the naphthalene nucleus may contain further substituents.

4. As new products O-arylsulfonyl-2.3-aminonaphthol compounds of the formula:

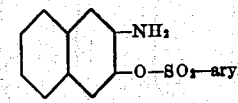

in which formula the naphthalene nucleus may contain further substituents, being crystalline colorless substances, having a definite melting point, which compounds are substantially identical with products obtainable by subjecting O-arylsulfonic esters of 3.2 hydroxynaphthalene-carboxyamido compounds to the action of alkali metal salts of hypochlorous or hypobromous acid according to Hofmann's reaction of decomposition.

In testimony whereof, I affix my signature.

ARTHUR ZITSCHER.